United States Patent [19]

Bovay

[11] Patent Number: 4,523,204

[45] Date of Patent: Jun. 11, 1985

[54] METHOD AND APPARATUS FOR TIMING RACES

[75] Inventor: Jean-Pierre Bovay, Bienne, Switzerland

[73] Assignee: SSIH Equipment S.A., Bienne, Switzerland

[21] Appl. No.: 597,566

[22] Filed: Apr. 9, 1984

Related U.S. Application Data

[63] Continuation of Ser. No. 334,012, Dec. 23, 1981, abandoned.

[30] Foreign Application Priority Data

Dec. 31, 1980 [FR] France ............................... 80 27958

[51] Int. Cl.³ ............................................. G01D 9/24

[52] U.S. Cl. .................................. 346/107 B; 346/1.1; 352/39; 354/109; 358/108

[58] Field of Search ........... 346/107 A, 107 B, 107 R, 346/1.1; 354/105, 106, 109; 358/108; 352/39; 368/1, 2, 9, 10

[56] References Cited

U.S. PATENT DOCUMENTS

| | | | |
|---|---|---|---|
| 2,590,389 | 3/1952 | Doyle | 346/107 B X |
| 2,641,523 | 6/1953 | Beckman | 346/107 B |
| 2,819,942 | 1/1958 | Goodling | 346/107 B |
| 3,502,009 | 3/1970 | Connors | 346/107 B |
| 3,678,189 | 7/1972 | Oswald | 346/107 B X |
| 4,253,753 | 3/1981 | Takahashi | 346/107 B X |

FOREIGN PATENT DOCUMENTS

| | | |
|---|---|---|
| 590518 | 8/1977 | Switzerland . |
| 410630 | 5/1934 | United Kingdom . |
| 1045434 | 10/1966 | United Kingdom . |

*Primary Examiner*—Joseph W. Hartary

*Attorney, Agent, or Firm*—Griffin, Branigan, & Butler

[57] ABSTRACT

A method for timing races and apparatus for performing the method including a cinematographic camera the lens of which is directed onto the finishing line. All data necessary for the evaluation of a race from preparation for start, start and finish appear on a single document which may be a photographic film or a magnetic tape. On such record will be shown the starting signal (37), the reaction times ($t_2$, $t_3$) of the participants of the starting signal, possibly the wind speed during the race and finally the arrival times ($t_6$, $t_7$) of the participants. The several parameters are recorded together with a scale giving reference times.

5 Claims, 3 Drawing Figures

METHOD AND APPARATUS FOR TIMING RACES

This is a continuation of application Ser. No. 334,012, filed Dec. 23, 1981, now abandoned.

BACKGROUND OF THE INVENTION

The present invention discloses a method for timing races and an apparatus for performing the method including a cinematographic camera, the lens of which is directed onto the finishing line in order to record second events occurring at the end of the race at a finish line.

Apparatus of this type, generally referred to as photo-finish, is known from British Pat. No. 1,045,434 in which there is described timing apparatus comprising a photographic camera for which the film is advanced in a uniform smooth fashion and having means enabling the photographing of a narrow space or one line at a time, and furthermore means permitting the projection of time indications onto the film.

A method for the determination of times separating the passages of moving objects across a reference line substantially perpendicular to the trajectory is furthermore known from Swiss Pat. No. 590 518. In this patent, the installation shown includes a television camera obtained from a conventional camera in which two scans are permuted in a manner such that the more rapid scan is effected along a vertical direction and for which the slower scan is suppressed.

In the first mentioned case there is employed a usual type of cinematographic camera recording onto a photographic film which is moved at a constant speed behind a slotted lens aimed along the finish line in order to determine the times separating the crossing of the finish line by the various participants. When a moving object crosses the finish line its image is thus reproduced on the film. There is recorded on the same film and at the same time as the images of the participants a time scale represented by reference points each spaced apart at one hundredth of a second. The camera includes a time counter which is started at the same time as the emission of a start signal for the race but for which the references are not recorded on the film since the latter is not started until a short lapse of time prior to the arrival of the participants at the finish. The film, once developed, will show the various stages of the crossing of the participants at the finish line.

FIG. 1 on the drawings will help in understanding the sequence of timing such as it appears according to known techniques utilised up to the present and such as has been described for instance in the journal "Die Uhr", No. 12, of 25th June, 1972 (pages 14–18). The race lanes, of which one only has been shown on the drawing, each include a starting block 2 represented here in the form of a starting block for a sprint type race. This block includes a switch 3 which will be actuated by the foot of the athlete at the moment of departure as well as a loudspeaker 4 intended to transmit to the athlete orders given by the starter and the start signal. The starter transmits his orders to the course by means of a microphone 5 of which the signal is amplified by an amplifier 6. The starter gives the start signal by pressing on the trigger of pistol 7. The detonation thereof is picked up by microphone 5 and is sensed by the runner in the loudspeaker 4. The pistol 7 includes a contact 8 which closes in synchronism with the detonation produced by the percussion on the cartridge. Closing of contact 8 sets off the counter of an apparatus 9 herein referred to as the control centre for false starts. The spread between the start signal sent to the centre via line 10 and the actual departure of the runner reaches the said centre via line 11 and is recorded onto a paper tape 12. Should there be a premature start, a false start signal 13 is emitted by centre 9 then amplified by the amplifier 6 in order to arrive finally at the headphones worn by the starter who has then the time to cancel the start. FIG. 1 further shows that at the end of lane 1 is to be found a finish line 15 onto which is aimed the cinematographic camera 16. Line 17 which couples the contact 8 of pistol 7 to the camera 16 permits the starting of the counter incorporated into said camera. Shortly before the arrival of the runners in the race the operator starts the film contained in the camera this having as a result, on the one hand, to inscribe the arrival times and, on the other hand, to photograph each runner as he crosses the finish line. The film 18 is thereafter developed in order to provide a record of results obtained by the several participants.

The system which has just been briefly described presents various difficulties. Initially the instant of starting the electronic counter in the camera does not always correspond to the moment at which the athlete senses the starting command, even if he has the advantage of the sound transmission installation described in FIG. 1 and shown by microphone 5, amplifier 6 and loudspeaker 4. Additionally no document carries the proof that the camera counter has been properly reset to zero and that it is restarted simultaneously with the start signal. A further difficulty results from the fact that the system requires the examination of separate documents: the first (paper tape 12) provides information concerning events which have taken place at the beginning of the race (start signal, reaction time of the athletes), the second (photo 18) of events occurring at the finish line (photo, time scale recorded). Finally there is no proof that for a given announced figure for the wind speed this figure corresponds to the course as shown up in the photographic document.

There is further noted the U.S. Pat. No. 2,590,389 which describes a horse race timing system and comprises essentially a moving camera which precedes the first horse in the race by about fifteen meters. At the same time that it records the development of the race, this camera records data relative to the elapsed time and the speed of the wind as carried by instruments situated in front of its lens. The classifying of the participants may be deduced from their apparent dimensions. However, additional indications in order to verify the position of the horses passing by an inspection post are only given by analysing the recordings made by another fixed camera for which the axis of the lens is perpendicular to the course line.

It will be understood from the above description that the system proposed is complicated and requires a moving camera subject to frequent mechanical problems. Moreover, the proposed system requires two documents in order to judge exactly the time and the ranking of the participants. In contrast to what has been previously described, it will be seen that the arrangement described in the present invention requires only one camera and a single document on which all data concerning the race are present thereby eliminating all controversy or risk of error.

DETAILED DESCRIPTION OF THE INVENTION

Figure 1:
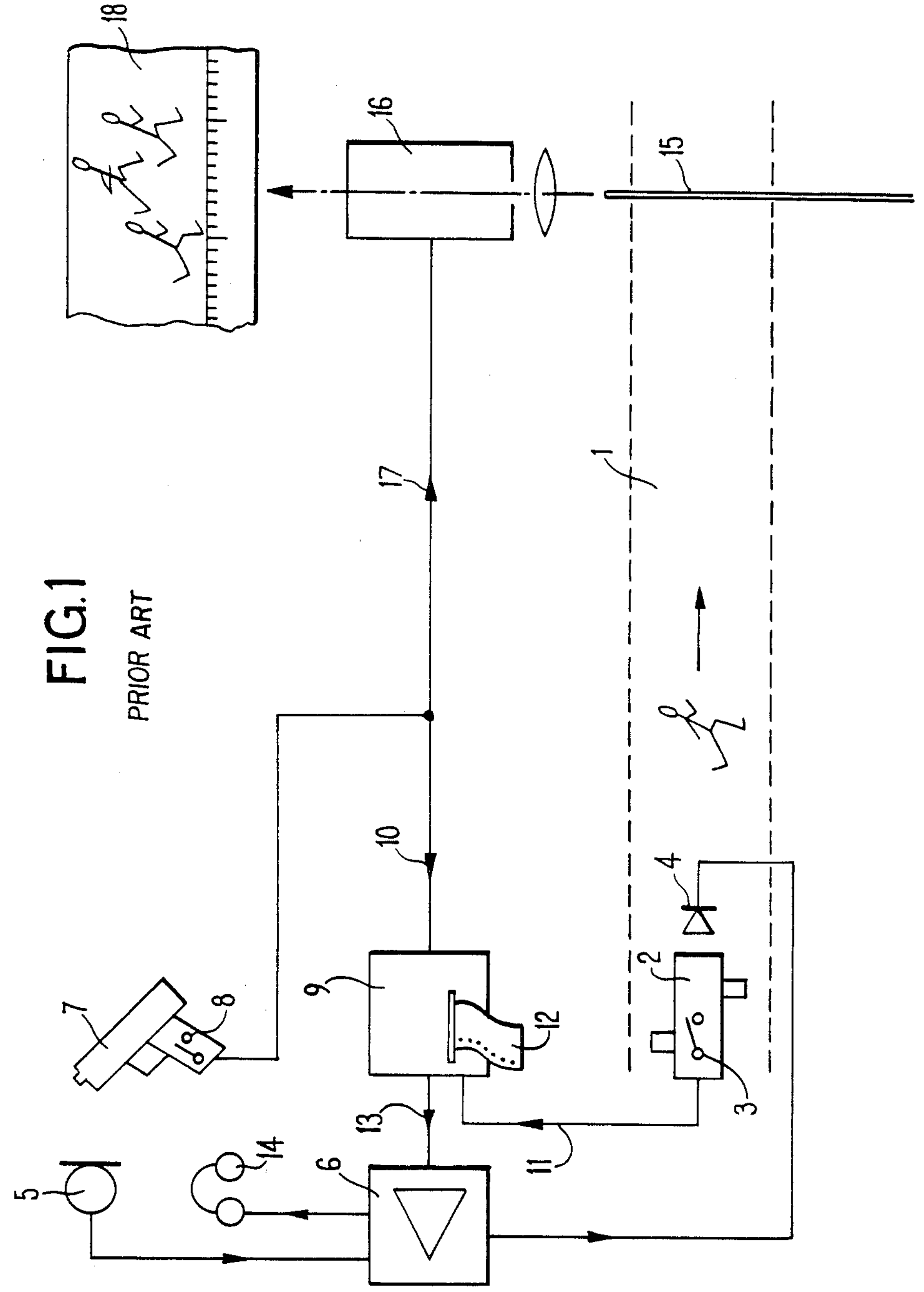
FIG.1 PRIOR ART
FIG. 1 shows a timing arrangement known from the prior art and which has previously been described herein.
Figure 2:
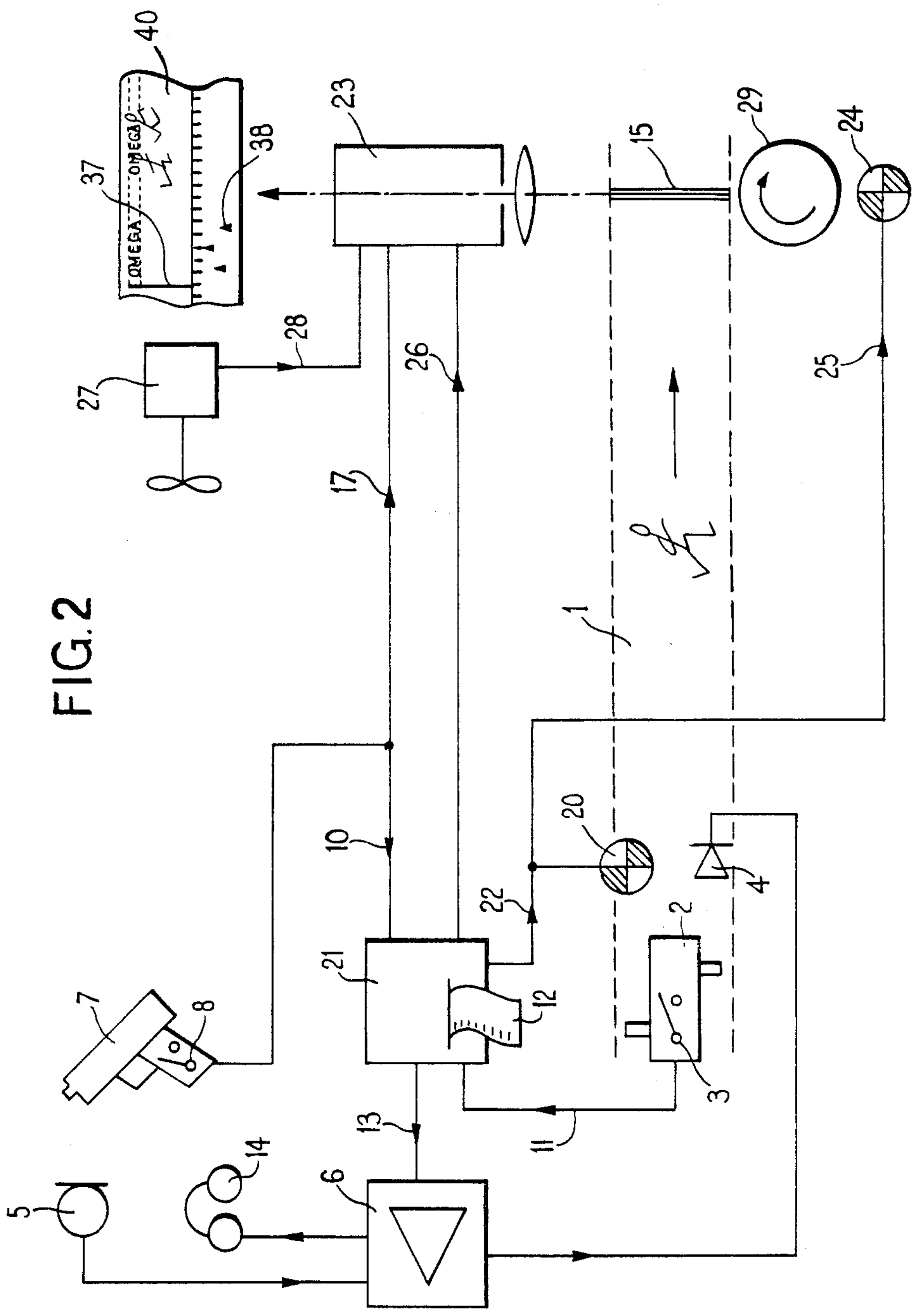
FIG. 2 shows a schematic drawing of the timing arrangement according to this invention.

FIG. 2 employs certain elements already discussed in respect of FIG. 1. There will accordingly be employed the same reference numbers.

The athlete takes his place, feet supported on the starting block 2 in lane 1 and facing the finish line 15. He then receives from the starter a preparation order via microphone 5, amplifier 6 and loudspeaker 4. Should one wish to avoid the sound transmission delay between the pistol and the ear of the runner which may extend up to six hundredths of a second, the same loudspeaker will transmit the starting signal given mainly by the percussion of the cartridge within the pistol 7. As indicated above, the starting of the camera counter actuated by the switch 8 of pistol 7 will not necessarily occur at the moment when the runner hears the detonation. Here there may be mentioned among various existing systems one in which the switch is closed by the firing pin of the pistol at the moment the latter strikes the cartridge, another wherein it is the pressure produced by the explosion which actuates a valve and mechanically transmits displacement thereof to the switch and finally one wherein the air pressure acts on a crystal which in turn electrically actuates a relay. All these systems, assuming that they may be duplicated easily, have different time constants which may extend to a hundredth of a second between the closing of the switch 8 corresponding to the starting of the camera counter and the percussion of the cartridge. Under present day standards it is observed that an interval of a hundredth of a second may be sufficient to separate the participants or to establish a record and that it will be understood that the present lack of precision does not favour the athlete.

To overcome the difficulties which have just been described, the invention proposes to provide each starting block with a luminous flash 20. This flash is set off by the closing of contact 8 via line 10, the control centre 21 and line 22. As the switch 8 starts the camera counter 23 via line 17 at the same instant, there is no spread between the starting of the counter and the perception by the athlete of the starting signal, whereby the lack of precision which has been mentioned hereinabove is avoided. It will also be understood that the proposed system is perfectly reproduceable since it is the same switch 8 which sets off the counter and the flash.

In presently known timing techniques, nothing proves that the camera counter has been set into operation at the moment when the start signal has been given. The present invention has as one object to overcome this difficulty in providing proof that such setting into operation has taken place. In order to assure this, there is arranged in a prolongation of the finish line 15 a luminous flash 24. This flash is set off by switch 8 via line 10, the control centre 21 and lines 22 and 25. The luminous flash therefore corresponds to the start signal for the race which simultaneously acts on individual flashes 20 as has been explained hereinabove. Since the flash 24 is to be found in the field of vision of camera 23, the flash will be recorded on the document produced by the camera and this at the time printed at the moment thereof on said document.

As one may also see from FIG. 2, switch 3 coupled to starting block 2 is connected to the centre 21 by line 11. The same is likewise the case for all of the other starting blocks not shown. As has already been said this arrangement enables the starter to interrupt the race should there have been a false start. In parallel with the recording of the spread existing between the actual departure of each participant and the start signal which appears on the paper tape 12 as has been discussed in respect of FIG. 1, the invention proposes to record this spread onto the document provided by camera 23 and this through line 26 which communicates to the aforesaid camera all the reaction times of the several participants. It is evident that if the impression on the paper tape is considered as superfluous, it may be abandoned.

Finally FIG. 2 shows an anemometer 27 which measures the wind speed. The value of this speed is transmitted to the document produced by the camera via line 28.

One now has available an arrangement which centralises all race data towards a central apparatus 23 capable of storing on a single and unique document the first events occurring at the beginning of the race (start, reaction time), the second events which occur at the end of the race (photo of the arrivals), the wind speed prevailing during the race and the time scale in respect of said events. This single document is important since it constitutes an absolute proof at the time when a race result or a record, for instance, must be agreed upon that all the cited events belong to a single and to the same competition. Doubts may no longer subsist concerning a true correspondence between the starting documents and arrival documents as could have been the case in previous arrangements. In the same manner in the arrangement proposed according to the invention, the good faith of the starter and the proper functioning of the apparatus at the beginning of the race may no longer be placed in doubt since the complete running of the race appears in its totality on the single document.

Figure 3:
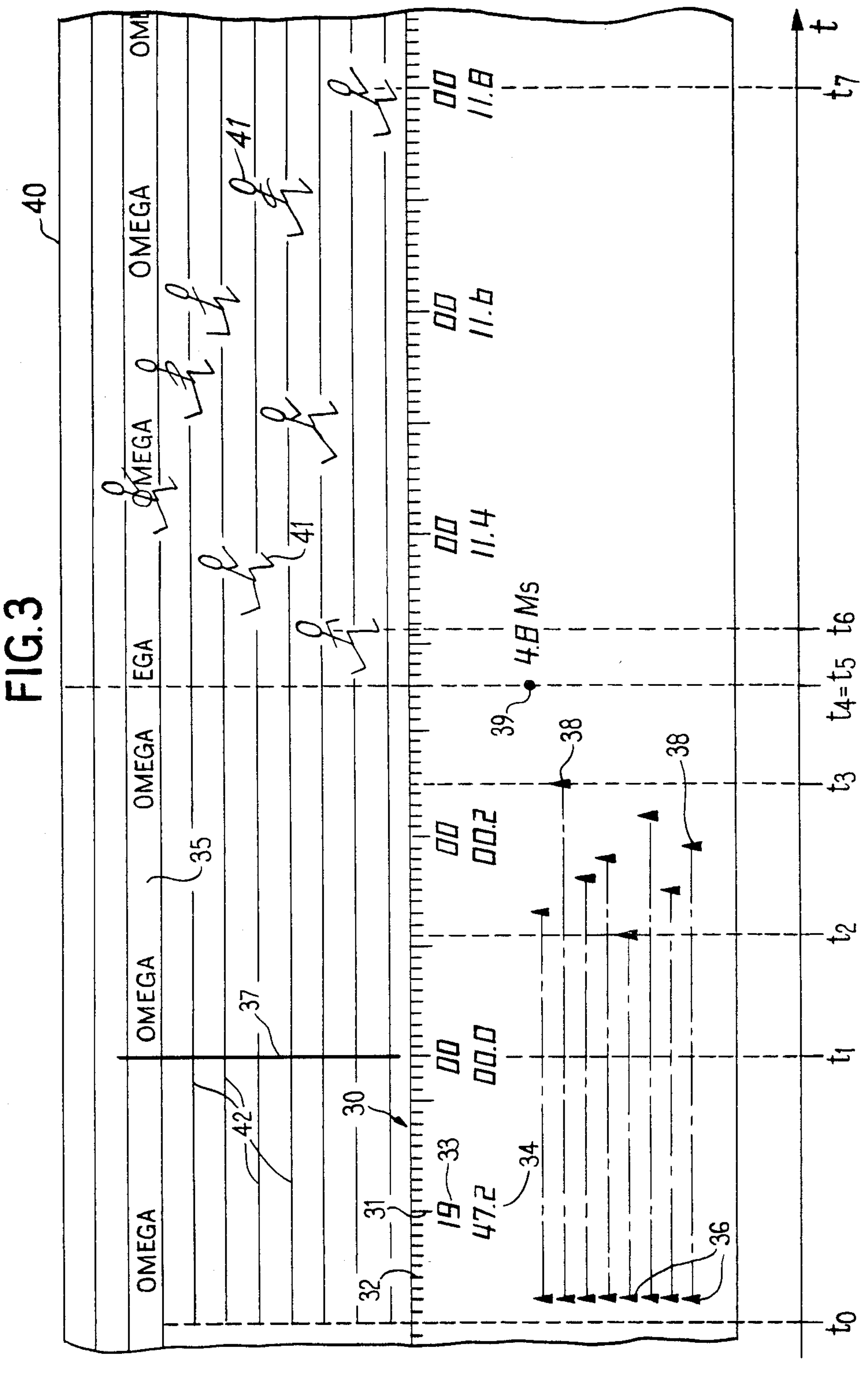
FIG. 3 shows an example of the type of document obtained by means of the arrangement shown in FIG. 2.

FIG. 3 is an example of what this single document may contain. Although not limited to this method as will appear further on, it will be supposed that this document is a photographic film arranged to be driven in the camera with a smooth and uniform motion. Reference will also be made to FIG. 2 in order to explain the events which appear on the document.

Film 40 comprises at 30 a time scale where the longer vertical lines 31 represent tenths of a second and the shorter vertical lines 32 hundredths of a second. Below this scale appear at 33 marking for minutes and at 34 marking of seconds and tenths of seconds. The means employed in order to realise the time scale and the markings are sufficiently explained in the British Pat. No. 1,045,434 mentioned hereinabove whereby it appears unnecessary to give further explanation here. It will, however, be noted that gas tubes which had been suggested in this patent may be advantageously replaced by a more modern technique which could use for instance light emitting diodes (LED).

The film further includes an identification inscription 35 which, in accordance with a known process, is obtained by filming a text to be found on a revolving drum in the prolongation of the finish line. This drum is shown at 29 on FIG. 2. It enables simultaneously the identification of the race and ensures a moving control of the film alignment.

At time $t_0$ shortly before the start of the race camera 23 is started. From this instant, time scale 30 is recorded on the film with an arbitrary marking 33, 34 that is to say that corresponding to the contents of the camera counter, e.g. 19 minutes 47 seconds and 2 tenths. At this moment furthermore, one may wish to check whether the control centre for the start is ready to function. Should such be the case said centre 21 transmits via line 26 one pulse for each starting block 2. These pulses each actuate a luminous source which will make an impression on the film by leaving thereon a mark 36 having for instance a triangular form. The upper triangle corresponds to the first lane of the race and the lower triangle to the last lane of the race. Instead of appearing in the lower portion of the film as shown in the drawing, this marking 36 could be placed on an upper portion of the film in respect of the race lanes 42 which are filmed by the camera from the moment of its start. The same remark is valid for marking the start 38 as will be explained further on.

At time $t_1$ the starter gives the start signal. At this instant, the camera counter is reset to zero and begins to count from this figure. Also at this moment, the flash given by flasher 24 records on a film by leaving thereon a vertical trace 37. It will be recalled here that trace 37 is exactly synchronised with all the individual luminous start signals 20 or, if the latter do not exist, is synchronised at some hundredths of a second with the start signal corresponding to the detonation of the cartridge in pistol 7. Trace 37 presents a further advantage: if for one reason or another (line 17 open circuited for instance) the camera counter was not reset to zero at moment $t_1$, it would still be possible to determine the time of each participant by calculating the difference between the arrival time and the departure time inscribed in respect of the luminous trace.

As soon as the start signal has been given, the participants leave their respective starting blocks and in so doing set off the switch 3 which via line 11, centre 21 and line 26 transmits one pulse per participant to camera 23. These pulses actuate luminous sources which are recorded on the film in the form of triangular marks 38 which are spread out in the vertical direction to enable identification of the race lanes. In the example shown, the first participant leaves at time $t_2$ and is to be found in the fifth lane and his reaction time has been 0.11 seconds. In the same manner, the last participant leaving at time $t_3$ is to be found in the second lane and his reaction time has been 0.25 seconds. Following the departure of all participants the film may be stopped (time $t_4$).

At time $t_5$ shortly before the finish of the race the camera is restarted. The counter which has not been stopped inscribes once again the elapsed time since the starting signal. Anemometer 27 transmits via line 28 an indication relative to the wind speed which is marked on the film at place 39 by means of techniques similar to those used for marking the time. It will be understood that this wind speed indication may also be made when the film is stopped, for instance during the period separating times $t_4$ and $t_5$.

Finally, during the period separating times $t_6$ and $t_7$ the arrival of all participants will take place, the first at time $t_6$ and the last at time $t_7$. Photographing of the order of arrival of participants 41 is realised by means of a slot directed onto the finish line as has been explained in the British patent cited hereinabove.

The invention is not limited however to a photographic document running continuously. It may likewise by applied to any document obtained by other means, the essential feature residing in the obtaining of a single document containing all data necessary for the appreciation of the running of a race from its start to its finish. Thus the employment of a film operated image after image may also be suitable. Recording processes employing a television camera and tape recorder with a single vertical scan or with a standard scan line trace could be foreseen in a similar manner. For example, as disclosed in Swiss Pat. No. 590,518, a start signal may be applied to a timing base which in turn produces signals to drive a symbol and marks generator and at the same time cause the repeated scan of a vertical line by a video camera. The video output of the camera and the output of the symbol and marks generator are applied to a video tape recorder which records the signals on tape. The recorder is connected to a TV monitor so that the recorded signals may subsequently be viewed.

Furthermore, the invention is not limited to the practical realisation which has been given hereinabove and on the drawing. It will be understood for instance that the marking of the start reaction times $t_2$, $t_3$ could consist of points or vertical traces in the place of the triangles as described. Moreover, the luminous flashes 20 and 24 could be actuated by opening contact 8 instead of by the closing of the said contact as has been explained above.

Finally, it is evident that flash 24 may be located relative to camera 23 on the other side of the finish line 15 rather than as shown in FIG. 2.

I claim:

1. A system for recording on a single document indications of first events occuring at the start of a race at a start line and second events occuring at the end of a race at a finish line, said system comprising:

a camera positioned at a fixed position at the finish line;

means for producing a start signal at said start line;

means responsive to said start signal for simultaneously therewith producing a manifestation of said start signal at said finish line;

means for producing manifestations of said second events at said finish line subsequent to said manifestation of said first event;

said camera including means for separately recording at the time of their occurrence and on a single document first said manifestation of said start signal as a first event and subsequently said manifestations of said second events; and, means for generating within the field of view of said camera a luminous indication for each race participant indicating the instant at which each race participant leaves said start line.

2. A system for recording on a single document indications of first events occuring at the start of a race at a start line and second events occuring at the end of said race at a finish line, said race having a plurality of participants racing in parallel race lanes, said system comprising:

a camera positioned at a fixed position at the finish line;

means for producing a start signal at said start line;

means responsive to said start signal for simultaneously therewith producing a manifestation of said start signal at said finish line;

means for producing manifestations of said second events at said finish line subsequent to said manifestation of said first event;

said camera including means for separately recording at the time of their occurrence and on a single document first said manifestation of said start signal as a first event and subsequently said manifestations of said second events;

a plurality of starting blocks there being a starting block corresponding to and located in each of said race lanes for emitting a signal at the actual instant of departure of the participant in the race lane from the starting block;

means connected to said starting blocks for transmitting the signals emitted by said starting blocks to said finish line and recording manifestations of said signals emitted by said starting blocks on said document whereby the time spread between said start signal and the instants of departure of each participant are recorded on said document as first events indicative of the departure reaction time of each participant.

3. A system as claimed in claim 2 wherein said means for transmitting and recording said signals emitted by said starting blocks includes means for producing, within the field of view of said camera, luminous indications of said signals emitted by said starting blocks.

4. A system as claimed in claim 2 wherein said document includes a plurality of tracks, one track corresponding to each of said race lanes, and the departure reaction time of each participant is recorded by said recording means on said document in the form of a mark for each participant, said mark being aligned in a given track on said document corresponding to the race lane in which a starting block emitted a signal, said recording means being arranged to record on the same given track said second event in the form of an image showing arrival at said finish line of the participant racing in the corresponding race lane.

5. A method for timing races including the steps of:

installing a camera at a fixed position;

directing the camera lens along a line which is in the same vertical plane as the finish line of the race to be timed;

operating the camera at least during a first interval which includes the starting time of the race and a second interval which includes the finish time of the race;

generating within the field of view of said camera lens data relating to events occuring during said first interval and further data relating to events occuring during said second interval; and operating said camera to record said data and said further data on a single document by, in sequence, starting the camera a short interval of time before starting the race thereby to record on the document whatever arbitrary data may be stored in a time counter;

starting the race by means of a start signal;

employing said start signal to reset the time counter to zero and to set off a luminous signal at the finish line thereby to record said start signal on the document;

recording on the document the reaction times of the race participants by means of signals transmitted from the starting position in each race lane;

stopping the camera during the race;

restarting the camera shortly before arrival of the first participant at the finish line thereby to record images of the participants along with their arrival times; and, stopping the camera at the end of the race.

* * * * *